No. 660,757. Patented Oct. 30, 1900.
E. MAERTENS.
PROCESS OF EXTRACTING OIL.
(Application filed Apr. 2, 1900.)
(No Model.)
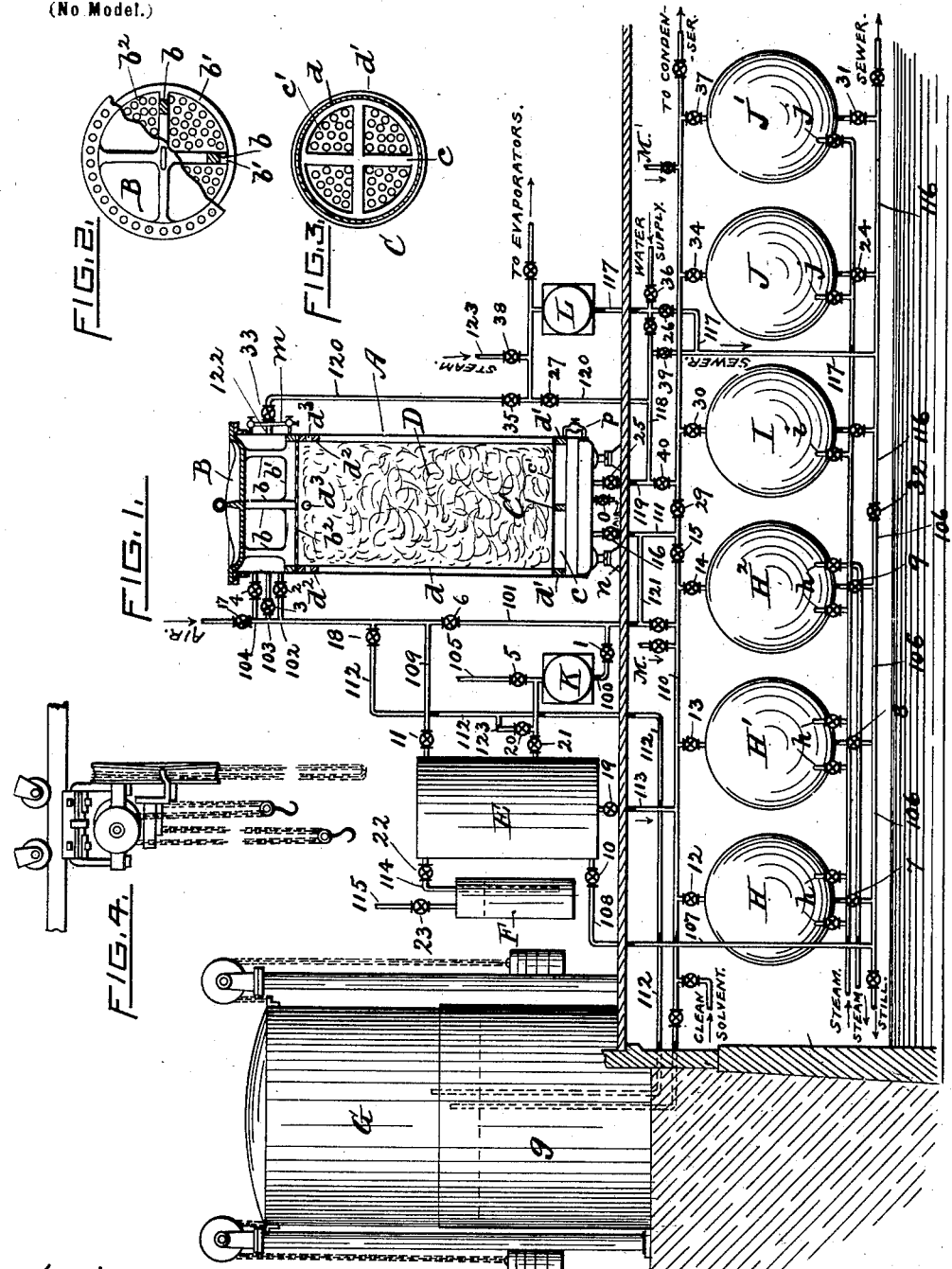
WITNESSES.
Charles T. Hannigan.
Rufus S. Mattison.
INVENTOR.
Emile Maertens

UNITED STATES PATENT OFFICE.

EMILE MAERTENS, OF PROVIDENCE, RHODE ISLAND.

PROCESS OF EXTRACTING OIL.

SPECIFICATION forming part of Letters Patent No. 660,757, dated October 30, 1900.

Application filed April 2, 1900. Serial No. 11,066. (No specimens.)

*To all whom it may concern:*

Be it known that I, EMILE MAERTENS, a citizen of the United States, residing at Providence, in the county of Providence and State of Rhode Island, have invented certain new and useful improvements in the art of cleaning wool and other animal fibers with volatile solvents, the object being to obtain the wool or fiber in a superior workable condition and to recover the by-products, such as wool-fat and the potash, of which the following is a specification.

The invention relates more specifically to the process of removing with water or aqueous solutions the residual solvent and potash salts which remain in the material under treatment after the fatty, oily, resinous, or other matters have been extracted therefrom with solvent, and is designed for use in establishments where existing conditions make such a process possible or desirable.

Referring to the accompanying drawings, Figure 1 is a general elevation of the apparatus with the digester and the cage or basket which it contains shown in section. Fig. 2 is a plan in partial section of the digester-cover B. Fig. 3 is a plan in section of the foraminous bottom C of the cage or basket. Fig. 4 shows a chain hoist with trolley and track.

A is the digester wherein the material to be extracted is placed while contained in a cage or basket and is supposed to be provided with a suitable opening and cover for loading and unloading the material and closing the apparatus. It rests on the supports $n$.

B is the cover of the digester, and fastened to it through brace-posts $b$ is a spider $b'$, covered with a foraminous plate $b^2$, which when in use closes the top of the cage or basket.

C is the bottom of the cage and is composed of the spider $c$, covered with a foraminous plate $c'$.

D is the cage, composed of the straight cylindrical part $d$, having two reinforcing-rings $d'$ and $d^2$. Ring $d'$ supports the bottom C, and ring $d^2$ reinforces the top and is provided with eyes $d^3$, which are used for hooking onto said cage and to lift it by.

E is a cooler or condenser.
F is an oil-condenser.

G is a gas-holder capable of vertical motion in the tank $g$.

H, H', and $H^2$ are storage-tanks for solvent, provided with heating-coils $h$.

I is a solvent-separating tank provided with steam-pipe $i$.

J and J' are potash-liquor tanks provided with steam-pipes $j$.

K is a vacuum-pump.

L is a liquor-pump.

M and M' are valves connecting with a source of compressed air or gas.

The various elements of the apparatus are provided wherever necessary with suitable valved inlet and outlet pipes, as well as with gages, drain-cocks, thermometers, sight-glasses, &c.

The method for operating the apparatus is as follows, the material to be extracted or treated being supposedly raw wool: A cage D (of which there are several) filled with raw wool is brought from the wool-warehouse or wool-sorting room into the extracting-room by way of an overhead trolley and track or by any other convenient means and is with suitable tackle lowered into digester A. The cover B is then secured into place, and a vacuum is created in the digester A by putting the latter in communication with the vacuum-pump K (which is started) by way of pipe 100, valves 1 and 6, pipes 101 and 102, and valve 2, the air exhausted being discharged into the atmosphere by way of valve 5 on pipe 105. When a suitable vacuum has been obtained, the pump K is stopped and the valves 1, 5, and 6 are closed. Steam having been turned on to the coil $h$ in reservoir H, (which holds solvent containing wool-fat in solution from previous operations,) the pressure rises in this tank, and when it becomes sufficient to force the solvent which it contains to the required height valve 7 under tank H is opened and the solvent passes through pipes 106 107 108 and valve 10 into the cooler E (where its temperature is regulated) and emerges from there by valve 11 and through pipes 109 101 102 and valve 2 enters the digester A at its top. When the digester is full of solvent, valve 7 is closed and steam is turned off from the coil in tank H and turned onto coils $h$ of tank H'. Valve 8 is now opened and so is valve 16 on pipe 111, valve 15 on pipe 110, and valve 12 on tank H. The solvent from tank H' (which is less charged with wool-fat than that first used) now follows the same course as that followed by the solvent which came from tank H, and it displaces the latter in the pipes and in the digester A; but valve 16 is throttled down sufficiently to prevent the old solvent from leaving the digester at the bottom any faster than the new solvent enters it at the top. When a little more solvent than the quantity originally taken from it has been returned to tank H, valves 12 and 8 are closed and steam is turned off on the coil of tank H' and turned on to coil $h$ of tank $H^2$. Valve 9 at the bottom of tank $H^2$ is now opened and also valve 13 at the top of tank H', and pure solvent forced out of tank $H^2$ now follows the same route as the previous lots and displaces the solvent which is in the pipes and in the digester and which originally came from tank H'. The pure solvent is forced from tank $H^2$ until a quantity of solvent a little larger than was originally taken from tank H' is returned thereto, the digester A at the same time remaining full of the pure solvent. Valves 13 and 9 are now closed and the steam is turned off from the coil in tank $H^2$. Atmospheric air let in by valve 17 at the top of riser 101, or, preferably, gas or air previously used for the same purpose and coming from holder G via pipe 112 and valve 18, is now admitted to the system. Valve 19 on pipe 113 under the cooler or condenser E is opened and so is valve 14 on top of tank $H^2$, and the solvent contained in the digester A, cooler E, and piping is allowed to drain into tank $H^2$. When this is done, valves 10, 11, and 18 are closed, a vacuum is made in the system, and the air or gas withdrawn by the pump K is returned to the holder G via valve 20 and pipes 123 and 112. When a sufficient vacuum has been obtained, valve 18 is opened, and the gas or air rushing into digester A compresses the wool in the cage D and squeezes out of it the bulk of the residual solvent, which drains into tank $H^2$. The vacuum-pump can be kept running for any suitable time, when a vacuum is then again made in the system, the gas or air being returned to holder G, and all the valves previously opened are again closed.

When atmospheric air is used for the squeezing operation just described in lieu of a stored gaseous medium, the condenser E is cut out of the vacuum side of the system by closing valve 19, and the atmospheric air circulated through the wool and pumped out of the system is freed from solvent vapors by being passed from pump K through the condenser E via valves 21 and 22 and from there through the oil-condenser F via pipe 114 before being discharged into the atmosphere through valve 23 on pipe 115.

The depotashing of the wool, the removal of the residual solvent still adhering to the fiber, the rinsing of the wool with water, and the squeezing out of the bulk of the residual water are accomplished in the following manner: Tank J, which contains potash liquor extracted in previous operations, but which is not sufficiently concentrated to warrant vaporization, is heated to the required degree by steam admitted through pipe $j$. Valve 24 at the bottom of tank J, valve 25 at the bottom of digester A, valve 26 on pipe 117, and valve 27 on pipe 120 are opened, and the liquor-pump L is put in motion. The solution drawn from tank J is discharged into the bottom of digester A, and as it rises it displaces the solvent adhering to the wool, and it gradually ascends, floating on the surface of the solution, until the wool is practically freed from it, and the said solvent forms a stratum on the surface of the liquid above the wool and the foraminous plate $b^2$, when pump L is momentarily stopped to allow the solvent to stratify and separate more completely. The line of stratification of the solvent is indicated by a telltale or water-glass $m$ or similar device, and according to its height valve 2, 3, or 4 is opened, and the solvent proper and that part of it which is partially emulsified with the potash liquor is drawn off into the solvent-separating tank I via valve 2, 3, or 4 and pipe 102, 103, or 104, valve 6, pipes 101 121 111 110, and valves 29 and 30, the pump L being operated slowly until the separation of the solvent proper and the emulsified part thereof from the bulk of the solution is complete, when valves 24 and 27 are closed and valve 31 at the bottom of tank J', valve 35 on pipe 120, and valve 33 on pipe 122 are opened. The liquor in tank J', which is a weaker potash solution than the one previously used or merely water, having been sufficiently heated by steam-pipe $j$ in tank J', the pump L is put in motion and at the same time valve 34 on top of tank J is opened. The liquor from tank J' now ascends pipe 117 and through valve 26 enters pump L, which forces it through valves 35 and 33 on pipes 120 and 122 in the top of digester A. Valve 40 on pipe 119 is now opened, and valve 25 at the bottom of the digester is throttled down, so as not to let the liquor out of the digester at the bottom into tank J any faster than the liquor from tank J' enters the digester at its top. When a quantity of solution a little larger than originally taken from tank J has been returned thereto, and which will have absorbed or dissolved the bulk of the potash salts contained in the wool, the pump L is momentarily stopped and valves 34, 31, and 26 are closed. Valve 36, communicating with a suitable supply of fresh water, is now opened and also valve 37 on top of tank J'. The pump L being put in motion, fresh water (which can be heated, if necessary, by mixing steam with it, admitted through valve 38 on pipe 123) is delivered in the top of the digester A and replaces the liquor originally drawn from tank J' and which is returned to said tank in a manner as previously described in relation to tank J. When a little more liquor has entered tank J' than was originally taken from it and which has now washed out the remainder of the potash salts contained in the wool, valves 37 and 40 are closed, the pump L is stopped, and valve 39, leading to the sewer or to a storage-tank, and valve 17, which admits atmospheric air, are opened, and the water contained in the digester A is allowed to run off via valves 25 and 39 on pipes 119 and 118. Valves 39 and 17 are closed as soon as the water is out of the digester A, and the latter is put in communication with tank J' via valves 25 and 40 on pipe 119 and valve 37 on top of said tank J'. The vacuum-pump is started and put in communication with digester A and tank J' via valves 1 to 16 and 29 and pipes 100, 121, 111, and 110, and when a sufficient vacuum has been obtained the pump K is stopped and valve 17 is opened. The incoming air compresses the wool contained in the cage D and squeezes the bulk of the residual water out of it, which water runs into tank J'. This operation is repeated, if found necessary; but neither the pressing out of the bulk of the residual water nor of the bulk of the residual solvent in the manner indicated is essential to the process.

The wool is deodorized by drawing air or air and steam through it in either direction by the pump K, the air entering the digester through valves 17 or O, while the steam is admitted to the system through valve 38. The cover B is now removed, and the cage D is lifted out of digester A by suitable tackle hooked in the eyes $d^3$ of said cage or basket, and it is sent by overhead trolley and track or other suitable means out of the extracting-room to some other part of the establishment, where its contents are emptied, to be further manipulated, while the cage is returned to the warehouse or sorting-room to be refilled with raw wool and again returned to the extracting-room.

The treating and handling of the wool in cages or baskets, as set forth, is a great convenience and saves considerable labor and rehandling of material and simplifies the traffic to and from an extracting plant, which is necessarily separated and at some distance from the main manufacturing plant.

The method of depotashing described in conjunction with or after an extracting process is capable of producing fully-saturated liquors, thus insuring a minimum of evaporation, and it also reduces to a minimum the quantity of solvent which is dissolved by the treating liquor used for its removal from the fiber. When the solvents used need rectification, they are sent, via main 106, to the still, (not shown on drawings,) where they are separated from the grease which they contain, and pure solvent is returned from the condenser (not shown on drawings) via main 110.

The solvent in tank I is separated from the aqueous solution in said tank by distillation, and the traces of solvent dissolved by the aqueous solutions or potash liquors in tanks J and J' are likewise recovered by distillation before said liquors are sent to the evaporators and potash-ovens, the solvent-vapors being sent to a condenser via valves 30, 34, and 37 and main 110 or by some other suitable connection.

With the aid of a vacuum and suitably warm aqueous solutions the residual solvent removed by said solutions, instead of being floated off or removed in liquid form, can be evaporated or separated from the aqueous solution in vapor form, drawn off by the pump K via valves 2, 3, or 4 and pipes 102, 103, or 104 and 101, valves 6 and 1, and pipe 100 and discharged into the condenser E via valve 21, and from said condenser emerge in liquid form through valve 19 on pipe 113 into a storage-tank.

It is evident that the solvent instead of being forced into the digester A by the pressure generated in the storage-tanks H H' H² can be delivered into said digester by the pump L by opening valve 32 and making pipes 106 and 116 intercommunicating, or the liquids employed can be forced into the digester by compressed air or gas, admitted through valves M or M', and which after use is returned to the holder G via pipes 110 101 112 and their valves.

The digester A can be provided with "heating means," such as coils, whereby the liquids employed might be heated in the digester itself, if desired.

When solvent heavier than water is used in the extracting operation, it is admitted to the digester from the bottom and the charged solvent is allowed to overflow at the top. The residual solvent in this case after precipitation is drawn off at the bottom, the digester and the tanks being so connected that the treating liquids can enter or be withdrawn either at the top or bottom of the digester.

It is obvious that, if desirable, two or more digesters might be operated simultaneously and that this only involves a duplication of parts.

The oil-condenser F is provided interiorly with a coil to which water or steam is admitted for either cooling the oil or distilling off the absorbed solvent, and the necessary connections for taking care of the solvent-vapors thus generated are of course provided. In practice it is best to use two or more oil-condensers, so that while one is absorbing the other or others can be distilling or cooling.

The small valved piping $p$ shown at the bottom of the digester is for the purpose of draining any liquids which may have accumulated between the inner shell of the digester and the outer shell of the cage into the bottom of the digester.

The apparatus hereinbefore described for extracting or cleaning wool is made the subject of my application Serial No. 11,067, filed concurrently herewith.

Having described my invention, what I claim is—

1. The improved process of cleaning wool which consists in confining the wool in a cage or basket placed within a closed digester, subjecting it therein to one continuous treatment or to successive treatments with solvent or solvents until the wool-fat is removed therefrom, draining the excess of solvent from the wool, producing a vacuum in the digester, admitting gaseous fluid to the digester whereby the bulk of the solvent remaining in the wool is removed therefrom and finally exhausting or removing the gaseous fluid from the digester.

2. The improved process of cleaning wool which consists in confining the wool in a cage or basket placed within a closed digester, subjecting it therein to the action of a solvent until the wool-fat is removed therefrom, producing a vacuum in the digester, admitting gaseous fluid to the digester to remove the bulk of the solvent from the wool and then exhausting or removing the gaseous fluid from the digester.

3. The improved process of cleaning wool which consists in confining the wool in a cage or basket placed within a closed digester, subjecting the wool to one continuous treatment or to successive treatments with solvent or solvents until the wool-fat is removed therefrom, allowing the excess of solvent to drain from the wool, producing a vacuum in the digester, admitting gaseous fluid under pressure to the digester, removing the gaseous fluid from the digester and finally removing the last traces of solvent from the wool.

4. The improved process of cleaning wool which consists in confining the wool in a cage or basket placed within a closed digester, removing the wool-fat from the wool by means of a solvent or solvents, producing a vacuum in the digester, admitting gaseous fluid to the digester while continuing the operation of the vacuum device, removing the solvent-vapors carried by the gaseous fluid thus exhausted and finally deodorizing the wool.

5. The improved process of cleaning wool which consists in confining the wool in a cage or basket placed within a closed digester, removing the wool-fat from the wool by means of a solvent or solvents, draining the excess of solvent from the wool, subjecting the wool to the action of a vacuum, removing the bulk of the adhering solvent therefrom by means of a gaseous agent, removing the residual solvent from the wool by means of a current of water or suitable aqueous solution and finally completing the depotashing of the wool.

6. The improved process of cleaning wool which consists in confining the wool in a cage or basket placed within a closed digester, removing the wool-fat from the wool, removing the bulk of the solvent remaining in the wool, floating the residual solvent to the top of the digester and draining it off, or (if heavier than water) precipitating it to the bottom of the digester and drawing it off, allowing the separating liquid to drain from the bottom of the digester and admitting water or water-carrying potash salts in solution at the top of the digester and continuing the operation until the wool is depotashed.

7. The improved process of cleaning wool which consists in confining the wool in a cage or basket placed within a closed digester, removing the wool-fat from the wool, allowing the surplus solvent to drain from the wool, floating the remaining solvent to the top of the digester or (if heavier than water) precipitating it to the bottom of the digester, by means of water or suitable aqueous solution, allowing the solvent and separating fluid to stratify, drawing off the solvent from the separating fluid, drawing off the separating fluid from the digester, continuing the treatment to remove the potash salts from the wool and finally removing the bulk of the fluid from the wool.

8. The improved process of cleaning wool which consists in confining the wool in a cage or basket placed within a closed digester, removing the wool-fat from the wool, removing the solvent from the wool, removing the potash salts from the wool by water or suitable aqueous solution, removing the bulk of the fluid from the wool and finally drawing air or steam or both through the wool.

9. The improved process of cleaning wool which consists in removing the wool-fat from the wool by means of a solvent or solvents, removing the solvent from the wool and finally treating the wool with aqueous solutions of potash salts of different degrees of saturation for the removal of the potash from the wool and the concentration of the potash liquor or liquors.

10. The improved process of cleaning wool which consists in removing the wool-fat from the wool by means of a solvent or solvents, removing the solvent from the wool, treating the wool with aqueous solution of potash salts of different degrees of saturation, removing the bulk of the fluid from the wool and finally drawing air or steam or both through the wool.

11. The improved process of cleaning wool which consists in confining the wool in a cage or basket placed within a closed digester, subjecting it therein to the action of a solvent or solvents until the wool-fat is removed therefrom, draining the solvent therefrom, removing the bulk of the adhering solvent therefrom by the action of a vacuum and finally removing the residual solvent therefrom by heat and a vacuum.

12. The improved process of cleaning wool which consists in confining the wool in a cage or basket placed within a closed digester, subjecting it therein to the action of a solvent or solvents until the wool-fat is removed therefrom, draining the solvent therefrom, removing the bulk of the adhering solvent therefrom, removing the residual solvent therefrom by heat and a vacuum and simultaneously dissolving out a part of the potash salts therefrom by water or suitable aqueous solutions and finally removing the bulk of the fluid from the wool.

13. The improved process of cleaning wool which consists in confining the wool in a cage or basket placed within a closed digester, subjecting it therein to the action of a solvent or solvents until the wool-fat is removed therefrom, draining the solvent therefrom, removing the bulk of the adhering solvent therefrom, removing the residual solvent therefrom by heat and a vacuum and simultaneously dissolving out the potash salts therefrom by water or suitable aqueous solutions, removing the bulk of the fluid from the wool and finally drawing air or steam or both through the wool.

14. The improved process of cleaning wool which consists in confining the wool in a cage or basket placed within a closed digester, subjecting it therein to the action of a solvent or solvents until the wool-fat is removed therefrom, draining the solvent therefrom, removing the bulk of the adhering solvent therefrom, removing the residual solvent therefrom by heat and a vacuum and simultaneously dissolving out the potash salts therefrom by water or suitable aqueous solutions, continuing the treatment to remove the potash salts from the wool and finally removing the bulk of the fluid from the wool.

15. The improved process of cleaning wool which consists in confining the wool in a cage or basket placed within a closed digester, subjecting it therein to the action of a solvent or solvents until the wool-fat is removed from the wool, draining the solvent therefrom, removing the bulk of the adhering solvent therefrom, removing the residual solvent therefrom, by heat and a vacuum and simultaneously dissolving out a part of the potash salts therefrom by water or suitable aqueous solutions, continuing the treatment to remove the potash salts from the wool, removing the bulk of the fluid from the wool and finally drawing air or steam or both through the wool.

In testimony whereof I affix my signature in presence of two witnesses.

EMILE MAERTENS.

Witnesses:
M. I. FAY,
R. S. MATTESON.